United States Patent

[11] 3,596,152

| [72] | Inventors | William M. Allison<br>Williamstown, Mass.;<br>Atlee Vail, Stamford, Vt. |
|---|---|---|
| [21] | Appl. No. | 2,228 |
| [22] | Filed | Jan. 12, 1970 |
| [45] | Patented | July 27, 1971 |
| [73] | Assignee | Sprague Electric Company<br>North Adams, Mass. |

[54] CAPACITOR WITH LAMINAR ELECTRODE
5 Claims, 2 Drawing Figs.

[52] U.S. Cl. ............................................. 317/258,
                                                    317/260
[51] Int. Cl. ................................................. H01g 3/195

[50] Field of Search ......................................... 317/258,
                                                                200

[56]                    References Cited
                 UNITED STATES PATENTS
3,211,973   10/1965   Ferrante .................... 317/260
3,289,059   11/1966   Bornard ....................... 317/260 X

*Primary Examiner*—E. A. Goldberg
*Attorneys*—Connolly and Hutz, Vincent H. Sweeney, James Paul O'Sullivan and David R. Thornton

ABSTRACT: The convolutely wound capacitor includes at least one laminar electrode wherein a metal foil is sandwiched between metallized insulative material and in connection along one edge of the conductive surface coatings thereof.

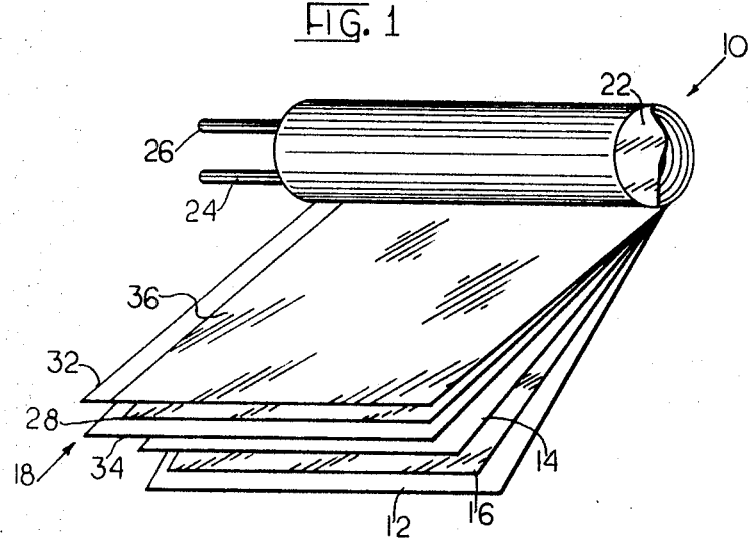
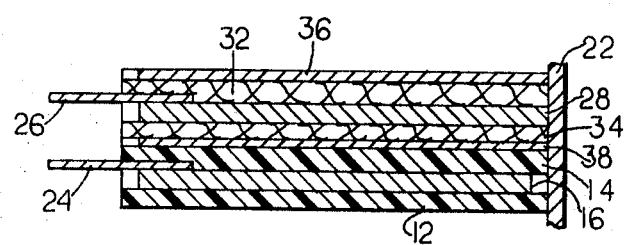

CAPACITOR WITH LAMINAR ELECTRODE

BACKGROUND OF THE INVENTION

This invention pertains to capacitors and more particularly to high-current, self-healing capacitors.

For high-current applications, extended metal foil electrodes are generally utilized because of their low resistance and ability to conduct and dissipate heat. However, this construction does not provide the self-healing characteristics of metallized film capacitors. In addition, foil with the dielectric film material generally employed in such capacitors fails to provide a wicking action for the impregnant.

SUMMARY OF THE INVENTION

It is an object of this invention to provide a metal foil capacitor having high-current and self-healing capabilities.

It is another object of this invention to provide a convolutely wound metal foil capacitor having a wick element.

Broadly, a capacitor constructed in accordance with the invention comprises a pair of electrodes convolutely wound in capacitive relationship with interposed dielectric material. At least one of the electrodes is a laminar electrode having a metal foil sandwiched between insulative layers and in connection to thin conductive coatings carried on their outer surfaces.

BRIEF DESCRIPTION OF THE DRAWING

FIG. 1 is a view in perspective of a capacitor constructed in accordance with the invention;

FIG. 2 is a view in section of the strips which make up the capacitor of FIG. 1.

DESCRIPTION OF THE PREFERRED EMBODIMENT

FIG. 1 shows a convolutely wound capacitance section 10 wherein dielectric spacing materials 12 and 14, of an organic polymer such as polypropylene film or the like, separate electrodes 16 and 18. Electrode 16 is a conventional metal foil of aluminum or the like while electrode 18 is a laminated electrode in which conductive elements are interconnected in extended foil fashion at one end of section 10 by conductive material 22 such as solder or the like. At the other end of section 10, terminal connection is provided to both electrodes 16 and 18 by tabs 24 and 26 respectively.

FIG. 2 shows the construction of electrode 18 wherein a metal foil 28 of aluminum or the like is sandwiched between insulative layers 32 and 34 of preferably porous material such as kraft paper or the like. Layers 32, 34 carry conductive surface coatings 36 and 38 which are separated from the metal foil 28 by the insulating material.

Coatings 36 and 38 are metallized deposits of aluminum or the like which are interconnected at one edge with foil 28 by solder 22. This provides a common connection between foil 28 and coatings 36, 38 so that they operate as a composite electrode. Since insulating layers 32 and 34 are internal to electrode coatings 36 and 38, they are essentially out of the electric field of the capacitor and do not contribute to power factor.

Terminal connection is provided in this embodiment by tabs 24, 26 which are inserted within winding 10 in a conventional manner (for example, stitched to respective foils) so as to connect to foils 16 and 28. All conductive members are conventionally margined at the tab end of the construction for high-voltage reasons, and foil 16 is also margined at the extended foil end so as to avoid breakdown to the interconnection of laminated electrode 18 at this edge.

The laminar structure of electrode 18 provides both the high-current-carrying capability of foil construction and the self-healing upon clearing of metallized coatings. Additionally, insulative layers 32 and 34 provide a wick which aids in impregnation. The extended foil connection of electrode 18 also provides a shorted turn effect which makes the tab position less critical as regards inductance. However, since the impregnated section is preferably enclosed in a metal container (not shown) it is generally necessary in such circumstances to electrically insulate solder 22 from the container bottom.

The following is a specific example of a capacitor constructed in accordance with the invention. A pair of 0.3 mil kraft paper strips, approximately 4 inches wide are each metallized on one side by conventional vapor deposit techniques to provide a coating having a resistivity of approximately 1 to 10 $X$ per square. The applied metal is aluminum, and a ⅛-inch margin is included at one edge of each strip. Each insulative strip is wound with its unmetallized surface adjoining a first foil electrode and with its metallized surface spaced from a second foil by a 0.35 mil thick strip of polypropylene film. Both foils are 0.25 mil aluminum. The first foil is equal in width to the metallizing and is disposed in registration with the latter. The second foil is one-eighth inch narrower than the metallizing and is positioned in the winding so as to provide a ⅛-inch margin at both ends of the section. During winding a tab is inserted in contact with each respective foil. The unmargined end of the first foil and the metallized coating are interconnected by a deposit of zinc and aluminum sprayed on the section end. This deposit is then coated with solder. The section is inserted in a metal container with its sprayed end, electrically insulated from the container bottom. The tabs are brought out through the container top by standoff terminals. The section is vacuum dried and then impregnated with mineral oil through an opening in the container. The opening is then sealed with solder.

Tab construction is utilized in the preferred embodiment, however, extended foil construction is also suitable. For example, foil 16 may be extended at the section end opposite to contact 22.

What we claim is:

1. A capacitor comprising a pair of electrodes convolutely wound with dielectric spacing material, one of said electrodes being a laminar electrode having a metal foil sandwiched between insulative layers, said layers carrying a thin conductive coating on the surfaces outermost from said foil such that said coating is separated from said foil by the insulating material, and said coatings being in metallic interconnection along one edge to said sandwiched foil.

2. The capacitor of claim 1 wherein the other electrode is a metal foil electrode.

3. The capacitor of claim 2 wherein said laminar electrode is wound in extended foil fashion, said coatings are metallized deposits which are in metallic interconnection with said sandwiched foil at its extended end.

4. The capacitor of claim 2 wherein said dielectric spacing material is an organic polymer film, and said insulative layers are of porous material so as to provide wicking.

5. The capacitor of claim 4 wherein said layers are paper.